March 4, 1952

C. A. LOVELL ET AL 2,587,635

SPACED-PULSE IMPULSE SENDER

Filed June 29, 1948

3 Sheets-Sheet 1

INVENTORS: C. A. LOVELL
D. B. PARKINSON
BY William F. Simpson
ATTORNEY

INVENTORS: C. A. LOVELL
D. B. PARKINSON
BY William F. Simpson
ATTORNEY

March 4, 1952

C. A. LOVELL ET AL 2,587,635

SPACED-PULSE IMPULSE SENDER

Filed June 29, 1948

3 Sheets-Sheet 3

INVENTORS: C. A. LOVELL
D. B. PARKINSON

BY William F. Simpson

ATTORNEY

Patented Mar. 4, 1952

2,587,635

UNITED STATES PATENT OFFICE 2,587,635

SPACED-PULSE IMPULSE SENDER

Clarence A. Lovell, Summit, and David B. Parkinson, Maplewood, N. J., assignors to Bell Telephone Laboratories, Incorporated, New York, N. Y., a corporation of New York Application June 29, 1948, Serial No. 35,926

20 Claims. (Cl. 179—90)

This invention relates to signaling apparatus and more specifically to telephone signaling apparatus of the preset type which generates pulses of electric current which may be transmitted over voice frequency channels.

In the usual type telephone signaling apparatus, each digit is selected and transmitted in sequence, and the selection of each successive digit cannot be made until the signaling pulses representing the preceding digit have been transmitted, thereby requiring an appreciable amount of time and presenting numerous opportunities for the operator to err. Each sequence of signaling pulses representing a called number is transmitted only once, so if any error occurs in the selection or transmission a wrong number will result. Furthermore, the usual type telephone signaling apparatus employs representation of digits comprising interruptions of direct current which must be transmitted over a direct current or an extremely low frequency transmission channel. Pulses of this type cannot be transmitted directly over the usual voice frequency channels and repeaters as employed in telephone systems. Also, the usual telephone central office switching systems require the signals to be stored in expensive and complicated equipment to be subsequently transmitted to another switching center, and often this process must be repeated several times.

An object of this invention is to provide signaling equipment in which the entire number to be called may be set by the operator prior to initiating the call and in which the signals representing the number are generated at a high rate of speed. Such an arrangement reduces the time and attention required by the operator, reduces the opportunity for error, and reduces the holding time of the equipment at the switching center, thereby materially reducing the cost of handling calls. Another object of this invention is to provide signaling equipment for generating pulses suitable for transmission over voice frequency communication channels, and in which the pulses representing the called number may be repeatedly transmitted without further attention on the part of the operator, thereby permitting the use of central office switching systems which complete the desired connection without requiring the signals to be stored. By generating pulses which may be transmitted over a voice frequency transmission path and repeating the entire number over and over, it is possible to transmit the number from a subscriber station to each of the switching devices or stations necessary to extend the transmission path to the called subscriber station.

A feature of this invention relates to signaling apparatus for generating pulses in which the magnitude of each digit of the number called is determined by the time elapsing between a reference or start pulse and a stop or digit pulse. In transmitting pulses of short duration over voice frequency transmission paths, difficulty is frequently encountered due to transients set up by the pulses. The transients are usually decaying alternating currents which are caused by resonant circuits encountered in the transmission paths, repeat coils, filters, and other transmission equipment. Transients resulting from the application of short pulses to such equipment frequently last a number of cycles and thus for an appreciable interval of time after the exciting pulse has terminated. This invention discloses apparatus adapted to space the signaling pulses so that ample time is allowed for the transients associated with or appearing incident to the application of each of the signaling pulses to the transmission system to die out sufficiently so that they will not interfere with the next signaling pulse. In this manner it is possible to prevent interaction between the various pulses representing the digits of the called number so that the number may be correctly received by the equipment at the central switching station.

These and other objects and features of the invention will be apparent from the following description, the appended claims, and the drawings, in which:

Figure 1:
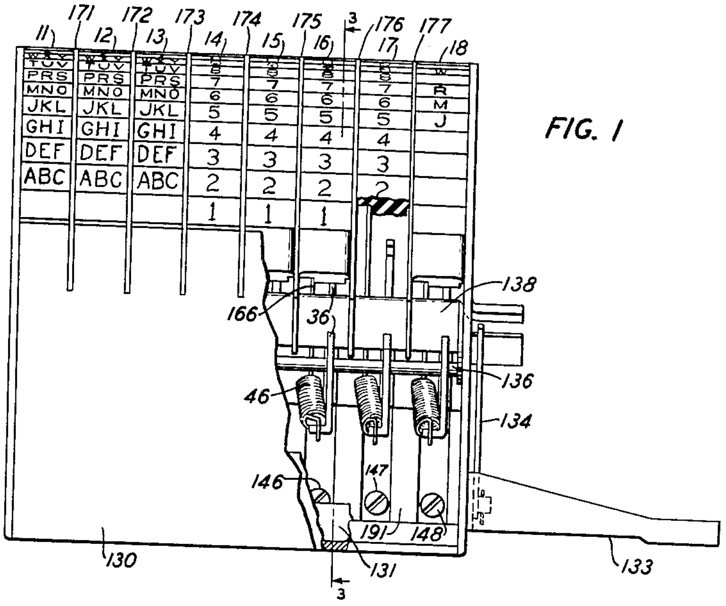
Fig. 1 is a front view, partially broken away, of the dialing apparatus.

The manner in which the apparatus disclosed in this application may be incorporated in a complete telephone system is disclosed in copending application Serial No. 35,925, filed June 29, 1948 of W. A. Malthaner. Suitable types of equipment for responding to the signaling pulses transmitted from the apparatus disclosed herein is disclosed in the copending applications of H. E. Vaughan, Serial No. 35,911, filed June 29, 1948 and W. A. Malthaner, N. D. Newby, and H. E. Vaughan, Serial No. 35,924, filed June 29, 1948.

A similar signaling device, upon which the arrangement herein disclosed may be considered an improvement, is disclosed in copending application Serial No. 35,930, filed June 29, 1948 of D. B. Parkinson. Reference may be made to the Parkinson application for a more detailed description of the time relationship between the various pulses.

In accordance with an exemplary embodiment of the present invention a simple electromagnetic pulse generator is employed to generate the necessary signaling pulses. The signaling apparatus is provided with a small electric motor which may be energized from current from a telephone line which interconnects the apparatus with the central switching office. The motor is employed to drive a rotor comprising a single permanent magnet, and this rotor causes the magnet to pass various impulse coils at predetermined times. Each revolution of the rotor corresponds to the time allotted for the generation of pulses representing one digit. The motor also drives distributor elements which operate at a rate of one revolution during the time allotted for the generation of pulses representing the entire number called. If desired, the number will be repeated as long as the motor is operated. A manually operated selector switch is provided for interconnecting the pulse generator and the distributor so that pulse representations of any desired number or combination of letters and numbers in accordance with the setting of the selector may be impressed across the telephone line.

In the exemplary embodiment shown, provision is made for the generation of pulse representations of eight characters during each cycle of operation, and these pulses are repeatedly generated as long as the motor operates. Any arbitrarily chosen number of representations of characters (within reasonable limits) may be generated by properly designed signaling apparatus. A signaling device capable of generating a maximum of eight representations of characters was selected for this disclosure since eight character calling numbers are in common use in telephone systems. It will be understood that these characters may be digits or letters or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words, each transmitted pulse of approximately 1-millisecond duration is in effect lengthened to a decaying alternating current of approximately 3½-milliseconds duration. At the end of this 3½-millisecond period or anytime thereafter, a second pulse may be transmitted.

The signaling system employed in this embodiment of the invention comprises a start pulse of 1-millisecond duration for each character, the start pulses being generated at 12½-millisecond intervals as long as the motor is running, and a stop pulse of 1-millisecond duration for each character, each stop pulse occurring during the 4 to 8½-millisecond interval of time after the start of the start pulse. In order to provide sufficient margins of safety to permit reliable signaling, 4 milliseconds are allowed for the decay of each pulse and the times of the start of transmission assigned to stop pulses representing digits of successive magnitude differ by ½ millisecond. Thus, digit 1 is represented by a start pulse followed by a stop pulse which is initiated 4 milliseconds after the start pulse was initiated, digit 2 is represented by a start pulse followed by a stop pulse which is initiated 4½ milliseconds after the start pulse was initiated, and so on. It will be observed that the stop pulse for the digit 0 is initiated 8½ milliseconds after its start pulse and 4 milliseconds before the next succeeding start pulse. Thus, there is required an increment of time of 4 milliseconds for the generation and decay of the start pulse, 9 increments of time of ½ millisecond each for the start of the generation of a pulse at any one of the 10 times necessary to represent the various digits, and a last increment of time of 4 milliseconds, all of the latter being required to permit the stop pulse to decay only if it should occur at the end of the 9th increment of time.

Consequently, 12½ milliseconds of time elapse between the start pulses of succeeding digits, from which it follows that 12½ milliseconds is required in this exemplary system to transmit each character comprising the called number. In order to indicate the starting point of the transmission of a called number a time interval of approximately 25 milliseconds is provided at the beginning of each pulse representation of a called number during which no pulses are transmitted. Thus, 125 milliseconds is required to transmit each called number comprising eight characters.

As discussed hereinbefore, the apparatus disclosed by this invention comprises a pulse generator, a distributor synchronized with the pulse generator, and a selector switch which interconnects the pulse generator and the distributor so that pulse representations of any eight-unit called number may be impressed across the telephone line.

Figure 2:
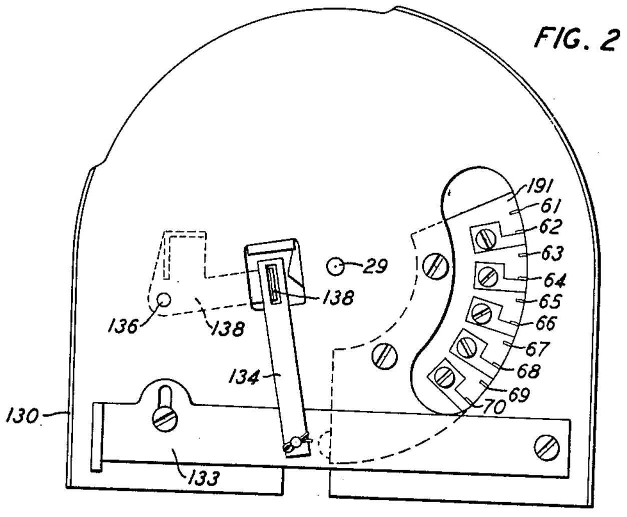
Fig. 2 is a side view of the same apparatus.
Figure 3:
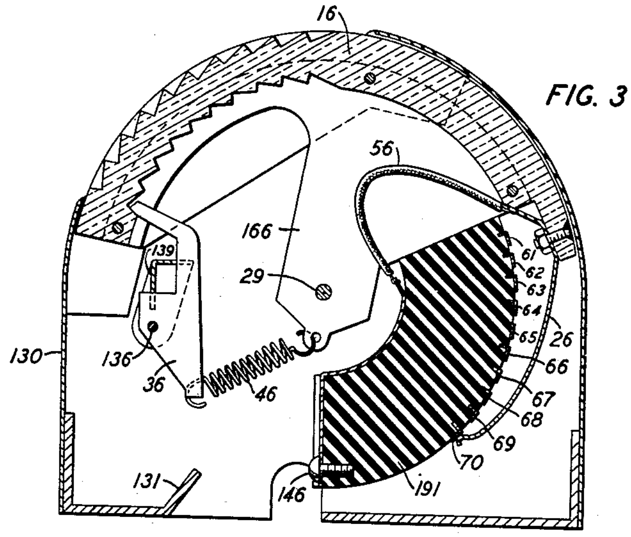
Fig. 3 shows a section taken along section line 3 of Fig. 1.

Figs. 1, 2 and 3 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage with and move the dial. The selector dials are separated by spacers 171 to 177 which are securely attached to case 130. As indicated in Fig. 3 each dial is attached to an individual support 166 so that each dial may be moved approximately ¼ of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator.

As indicated in Fig. 3, detent pawl 36 which corresponds to dial 16, is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentions in a dial an operator can move the dial in either direction and so that the action of the pawl against the grooves secures the dial in any of the ten positions to which it may be moved. The rotary movement of the dials is limited to about ¼ of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in its corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connected to each dial and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 is attached to case 130 and serves to support the various terminals and conductors, and the ten conductors 61 to 70 which may be contacted by spring contacts 21 to 28 are mounted thereon.

Figure 4:
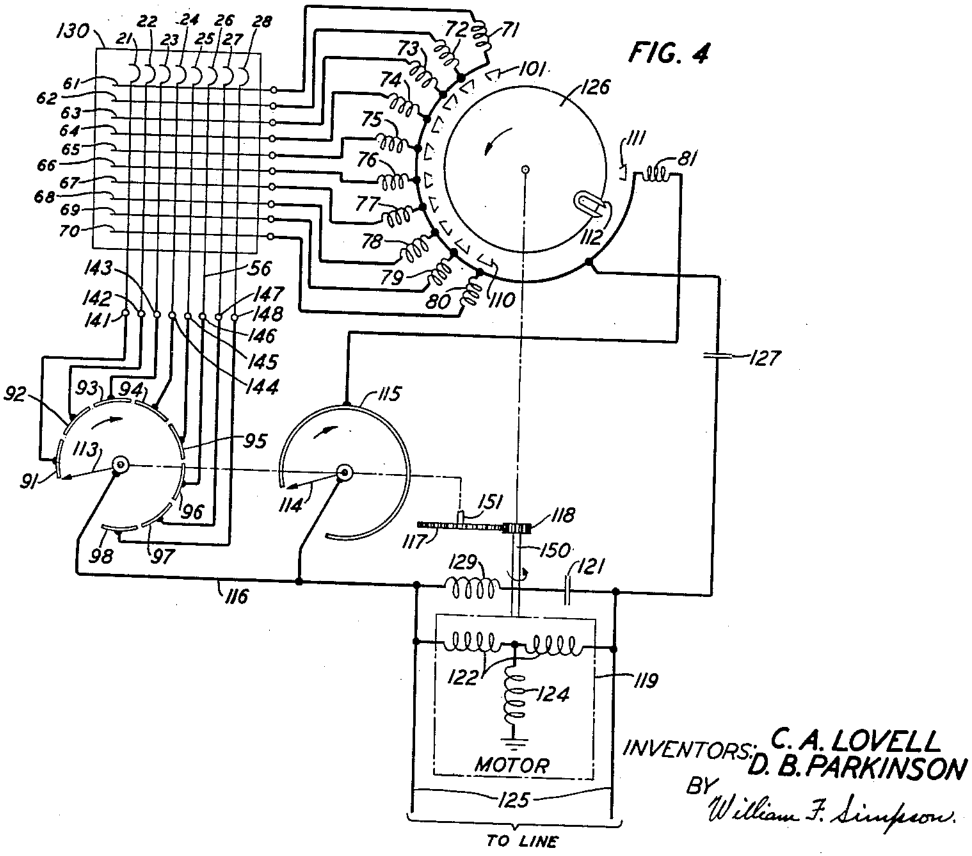
Fig. 4 shows the manner in which the dial, the various coils, the motor, and other equipment are interconnected to cooperate one with another and with the telephone line.

Terminals 141 to 148 are connected to commutator segments 91 to 98 and conductors 61 to 70 are connected to pulsing coils 71 to 80 as indicated in Fig. 4 wherein selector switch 130 is indicated in schematic form.

Figure 5:
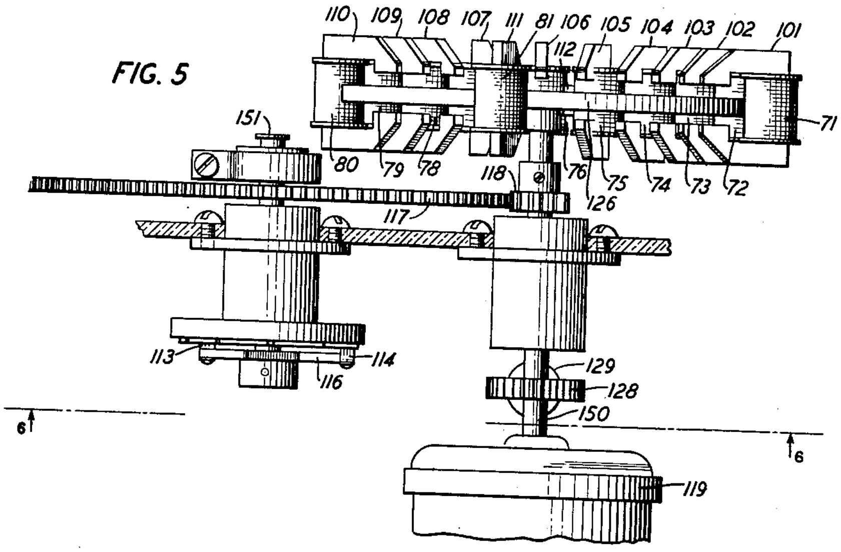
Fig. 5 is a top view showing the motor and the various elements which are driven by the motor as well as the magnet and the various coils and the manner in which they are mounted so as to generate the pulses.
Figures 6, 7:
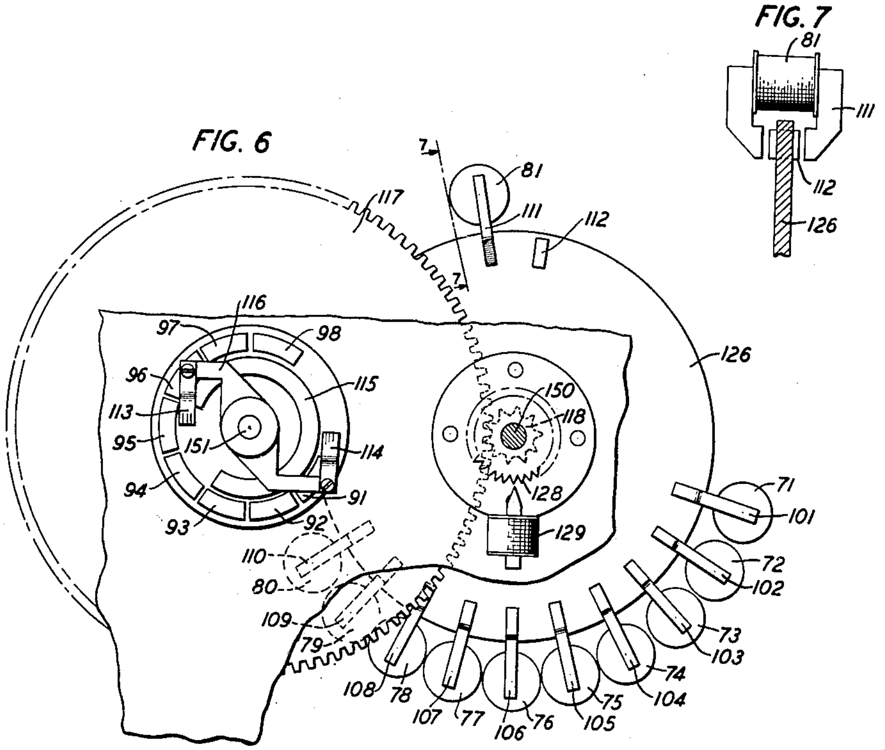
Fig. 6 shows a section taken along section line 6 of Fig. 5.
Fig. 7 shows a section taken along section line 7 of Fig. 6.

The driving motor, pulse generator, and distributors are also indicated in schematic form in Fig. 4, and the mechanical features of these elements are shown in Figs. 5 and 6.

Motor 119 may be an alternating-current or a direct-current motor including an induction or a synchronous two phase motor. Copending application Serial No. 35,930, filed June 29, 1948 of D. B. Parkinson discloses a method of employing a synchronous two phase motor in a similar system and the Parkinson application is incorporated herein by reference as a part of the present specification. In the embodiment of this invention disclosed in Fig. 4, motor 119 is an alternating current, two phase induction type operated by windings 122 and 124. These two windings are shown separate from motor 119 for convenience, but it will be understood that the windings are a part of the motor structure. In order to obtain power for energizing the motor windings the well-known simplex circuit is employed. In the simplex circuit, alternating current to energize winding 124 is applied between the two line conductors and ground, connection between the source of alternating current and the two line conductors being effected by the use of a simplex coil. Alternating current to energize simplex winding 122 of the motor is applied directly across conductors 125. Simplex winding 122 presents a high impedance to the signaling pulses or currents but permits the power supply alternating current which is applied between line conductors 125 and ground to pass through each half of simplex winding 122 to winding 124. In this manner it is possible to transmit the power required to operate the motor over a telephone line.

In order to drive the pulse generating apparatus at a constant speed so that the signaling pulses will be accurately timed, means must be provided to control the current applied to induction motor 119. In the embodiment of the invention shown in this disclosure, pickup coil 129 and toothed wheel magnet 128 serve to generate an alternating current whose frequency is determined by the speed at which the motor rotates. Coil 129 is connected in series with condenser 121 across line 125 so that the signal generated by the coil is transmitted by the line to the central switching center and power supply. This signal is employed at the central power supply to control the electric current supplied to motor 119 over the simplex circuit. The impedances of coil 129 and condenser 121 are proportioned so that they offer a high impedance to the signaling pulses.

It will be observed that an alternating-current signal generator is not required in case a motor which rotates at substantially constant speed is employed.

Also, it will be apparent to one skilled in the art that various arrangements are feasible for supplying power for operating the motor locally.

Motor 119 drives shaft 150 which is directly connected to gear 118 and rotor 126. Gear 118 drives gear 117 which is in turn connected to shaft 151 which is connected to rotors 113 and 114 of the distributor. The gears are proportioned so that shaft 151 rotates at one-tenth the speed of shaft 150.

Fig. 7 shows one embodiment of a pulsing coil and its associated pole-piece and one way in which the rotor magnet may be passed between the pole-pieces.

Rotor 126 contains permanent magnet 112 mounted near the outer periphery of the rotor. Pulsing coils 71 to 81 and their respective pole-pieces 101 to 111 are mounted in a fixed annular pattern around rotor 126 in such manner that each time the rotor makes a revolution magnet 112 is caused to pass between the pole-pieces of each coil. The rotor is moved at a speed which causes it to make one revolution in approximately 12½ milliseconds. Coil 81 and pole-piece 111 serve to generate the start pulse for each digit and are separated from the other coils and pole-pieces. Coils 71 to 80 and their associated pole-pieces are evenly spaced around the rotor and positioned so that the pulses generated by coil 71 occur at approximately 4 milliseconds after the pulses generated by coil 81 occur and so that the pulses generated by coils 72 to 80 occur at successive times of ½ millisecond after the pulse generated by coil 71. One side of each of the pulsing coils is connected to one wire of line 125 through condenser 127. The other side of each of pulsing coils 71 to 80 may be connected to the other wire of line 125 through selector switch 130 and distributor rotor 113, and the other side of pulsing coil 81 may be connected to line 125 through distributor rotor 114.

The distributor rotors are geared to the motor so as to rotate at one-tenth the speed of the magnet rotor. Rotor 126 revolves ten times and rotors 113 and 114 revolve one time during the generation and transmission of pulse representations of a called number made up of eight characters. The three rotors are synchronized so that rotor 114 contacts the split-ring conductor 115 and thereby connects coil 81 across line 125, and so that rotor 113 connects successively to commutator segments 91 to 98 during the time required to generate the signaling pulses representing the called number.

Each commutator segment is connected to one of the selector switch spring contacts such as contact 26 indicated in Fig. 3. Thus, the setting of selector switch 130 and the position of rotor 113 determines which pulsing coil is connected across line 125 during each revolution of rotor 126. It will be observed that this method of selectively connecting pulsing coils across line 125 determines the time relationship between each start and each stop pulse. Pulsing coil 81 is connected across line 125 during the entire time required to generate the signaling pulses representing the called number and one of the pulsing coils 71 to 80 is connected across the line during the time when each start pulse is generated; however these coils are designed so as to offer a high impedance to the signaling pulses so that a negligible amount of current is dissipated by the shunt connection.

During the final portion of each revolution of rotors 113 and 114 there is an interval during which neither rotor connects a pulsing coil to line 125, and, as discussed hereinbefore, this long interval during which no pulses are transmitted allows the position of the various characters in the number to be recognized and enables the central office switching equipment to properly respond to the number. During this interval rotor 126 revolves two times, but no pulses are transmitted through line 125 since all the pulsing coils are disconnected.

Motor 119 may start driving the three rotors from any of the various positions in which they may stop, consequently the first series of pulses transmitted will not ordinarily represent the complete number which is to be called. As disclosed in copending application Serial No. 35,925, filed June 29, 1948 of W. A. Malthaner, the central office switching equipment is designed to reject the signaling pulses unless the correct number of pulses is received between each no-signal period. Also, the no-signal period preceding each group of pulses must be of a certain duration before the central office equipment will respond.

The signaling apparatus disclosed herein may be used as part of a subscriber's telephone station or as part of a central office operator's equipment. Ordinarily it will be desirable to interpose a manually operable switch between the signaling apparatus and the telephone line. This switch would serve to deactivate the motor and place the station in condition to receive a call when in its normal position, and to place the station in condition to generate and transmit signaling pulses when in its operated position. It is apparent that the selector switch 130 could be modified so as to include a telephone handset cradle and switch of conventional design.

In this case the switch would be in its normal unoperated condition while the handset is resting in its cradle, and it would be operated when the handset is removed.

Under some circumstances it may be desirable to provide for the continuous operation of motor 119 and employ a separate switch for connecting the pulsing coils across the line.

In using the signaling apparatus, the subscriber or operator will first position dials 11 to 18 so that the number to be called appears on a horizontal line slightly above the front face of case 130. It is to be observed that the operator has this number before him at all times and may check it at any time before, during, or after the call. The operator will then cause the signaling pulses to be transmitted by switching the signaling apparatus across the line.

While motor 119 is energized it will cause rotors 113, 114 and 126 to revolve continuously. As these rotors revolve, a series of start pulses will be transmitted and each start pulse will be followed by a stop pulse as determined by the setting of selector switch 130. Each series of signaling pulses will be interrupted by a no-signal interval of time of predetermined duration. As long as motor 119 is energized, it will rotate continuously and cause pulses representing the called number to be continuously repeated and transmitted over the line.

These pulses are transmitted over the line to a central switching station where they are received and recorded by equipment such as disclosed in copending application Serial No. 35,911, filed June 29, 1948 of H. E. Vaughan, or Serial No. 35,924, filed June 29, 1948 of W. A. Malthaner, N. D. Newby, and H. E. Vaughan.

At the completion of the setting up of a path to a called station, the circuits of the called station and the central office will operate in a manner similar to that set forth in copending application Serial No. 35,925, filed June 29, 1948 of W. A. Malthaner, which circuits function to disconnect the pulse generating equipment from the line and connect the calling station's telephone circuit to the line. In addition, the motor may be stopped at this time if it is so desired. At the completion of the call or before the next call is made the dials are returned to their normal position as indicated in Fig. 1 by pressing release lever 133. After this has been done the apparatus is again in condition to be positioned and operated as discussed above.

Although specific embodiments of this invention have been shown and described, it will be understood that modifications may be made therein without departing from the scope and spirit thereof as defined by the appended claims.

What is claimed is:

1. A signaling apparatus comprising an electric line, a magnet, a plurality of coils, apparatus for rotating said magnet past said coils for successively inducing voltages in said coils, and circuit closing devices for selectively connecting two of said coils to said line during predetermined revolutions of said magnet for applying the voltages induced in said two coils to said line.

2. In a telephone system, a telephone line, a motor, an electrical transmission path between said motor and said line, a magnet, a plurality of coils, means including said motor for rotating said magnet past said coils at substantially constant speed for inducing voltage pulses in said coils in succession, and selectively operable contacts for selectively connecting two of said coils to said line during predetermined revolutions of said magnet for transmitting two pulses separated by predetermined time intervals to said line during said predetermined revolutions of said magnet.

3. A signaling device comprising a telephone line, a magnet, a plurality of coils, means for repeatedly moving said magnet past said coils successively at a constant speed, and circuit closing devices for selectively connecting two of said coils across said telephone line at predetermined times, whereby two pulses of electric current are transmitted over said telephone line during predetermined times said magnet traverses said plurality of coils.

4. A signaling device comprising a telephone line, a magnet, a plurality of coils, means for repeatedly moving said magnet past said coils successively at a constant speed, and means for selectively connecting two of said coils across said telephone line at predetermined times, whereby two pulses of electric current are transmitted through said telephone line for each symbol representing one unit of a multi-unit called number.

5. A telephone calling device comprising a voice frequency transmission path, a plurality of impulse coils, apparatus for moving a magnetic field past said coils at a constant speed, means for connecting one of said coils to said transmission path at a plurality of regularly recurring intervals of time, and means for selectively connecting predetermined ones of the remaining coils to said transmission path at predetermined times during the intervals between each of said intervals of time.

6. A telephone signaling apparatus comprising a telephone line, a magnet, a plurality of coils, apparatus for rotating said magnet past said coils for inducing successive voltages in said coils, means for connecting one of said coils to said line during predetermined revolutions of said magnet, and means for selectively connecting one of the remaining coils to said line during each of said predetermined revolutions of said magnet whereby two voltages are transmitted to said line separated by time intervals determined by the coils selected during each of said predetermined revolutions of said magnet.

7. A telephone signaling apparatus comprising a telephone line, a magnet, a first coil, a plurality of other coils, said coils being placed in an annular pattern around the shaft of said rotatable magnet, apparatus for rotating said magnet past said coils at substantially constant speed for inducing a voltage in each of said coils each time said magnet is rotated past said coils, means for connecting said first coil to said line during a predetermined number of revolutions of said magnet, and means for selectively connecting one of said other coils to said line during each of said predetermined revolutions of said magnet whereby two pulses separated by predetermined time intervals are transmitted to said line during each of said predetermined revolutions of said magnet.

8. A telephone calling apparatus comprising a telephone line, a magnet, a plurality of coils, apparatus for rotating said magnet past said coils at substantially constant speed, a distributor, a selector switch for interconnecting said coils with said distributor, means including said distributor for connecting one of said coils to said line during predetermined revolutions of said magnet, and means including said distributor and selector switch for selectively connecting one of the remaining coils to said line during each of said predetermined revolutions of said magnet.

9. In a telephone calling system, pulsing apparatus comprising a magnet, a plurality of coils, apparatus for rotating said magnet past said coils at substantially constant speed, means including said pulsing apparatus for repeatedly generating reference pulses, a plurality of settable members, means for independently setting each of said members in any one of a plurality of positions, and apparatus including said pulsing apparatus and settable members for repeatedly generating a series of pulses, each pulse of each series being generated at a predetermined time relative to each reference pulse as determined by the position of said settable members.

10. In a telephone signaling system, a pulse generator for generating electric pulses of short duration having voice frequency components, a voice frequency transmission path, a selector switch, means including said selector switch for connecting said path to said generator, said generator comprising a start coil and a plurality of stop coils, apparatus for moving a magnetic field past each of said coils for inducing pulses of voltage in said coils one after another, and means for selectively connecting said start coil and one of said stop coils to said transmission path at predetermined times in accordance with the designation of the called station whereby two pulses are transmitted during said predetermined times separated by predetermined time intervals representing the designation of the called station.

11. A pulse generator comprising a magnet, a plurality of coils, means for rotating said magnet past said coils, a plurality of distributor segments, means for selectively interconnecting said segments with one terminal of each of said coils, a distributor rotor, and means for moving said rotor across said segments at a speed directly proportional to the speed of said magnet.

12. A pulse generator comprising a magnet, a plurality of coils, means for rotating said magnet past said coils, a plurality of distributor segments, means for selectively interconnecting said segments with one terminal of each of said coils, a distributor rotor, and means for moving said rotor across said segments for a portion only of each revolution at a speed directly proportional to the speed of said magnet.

13. A pulse generator comprising an electric line, a magnet, a plurality of coils, means for rotating said magnet past said coils, distributor means rotating at a speed directly proportional to the speed of said magnet, means for connecting one of said coils to said line for a portion of each revolution of said distributor means, a plurality of distributor segments, means for successively connecting said segments to the line during said portion of each revolution of said distributor, and means for selectively interconnecting said segments with said coils.

14. In combination in a telephone system, signaling apparatus for repeatedly generating calling signals representing multisymbol station designations comprising a start pulse coil, a plurality of stop pulse coils, a magnet, means for moving said magnet past all of said coils for each symbol of said designations for successively inducing a voltage in each of said coils, a distributor segment for each of the symbols positions of said designations, means for establishing a connection to each of said segments once for each complete station designation, and apparatus for selectively interconnecting said coils and said segments whereby two pulses are transmitted and separated by time intervals in accordance with the identity of the symbol of said designations represented thereby.

15. A signaling apparatus comprising an electrical line, a start coil, a plurality of stop coils, cyclically operable means for generating an electrical impulse in each coil during each cycle of operation, each cycle of operation recurring at regular intervals of time, means for connecting said start coil to said line during a predetermined number of said cycles of operation, and means for selectively connecting one of said stop coils to said line during each cycle of said predetermined number of cycles of operation whereby two pulses separated by predetermined time intervals are transmitted to said line.

16. A settable selector switch comprising a plurality of manually movable dials, finger indentations in each dial corresponding to the characters to be selected, means for securing each dial in a position corresponding to the character selected, a plurality of contacts corresponding to the characters to be selected, and a conductor attached to each dial and adapted to connect with one of said contacts in accordance with the position of the dial.

17. A settable selector switch comprising a plurality of manually movable dials, finger grooves in each dial bearing indicia representing the characters to be selected, means for securing each dial in a position corresponding to the character selected, a plurality of contacts corresponding to the characters to be selected, a conductor attached to each dial and adapted to connect with one of said contacts in accordance with the position of the dial, and means for manually restoring the dials to their starting positions.

18. A telephone dialing system comprising apparatus for generating two pulses representing each digit of a number comprising an electric motor, a subscriber's line, an electrical transmission path from said subscriber's line to said motor, a pulse generator driven by said motor for generating a start pulse for each digit of said number and for generating a stop pulse for each digit of said number at different time intervals following the start pulse, a motor driven distributor, manually movable dials, means for securing each dial in a position corresponding to a digit of said number, contacts controlled by said dial for interconnecting said distributor and said pulse generator.

19. In a telephone system, a telephone line, an electric motor, an electrical transmission path between said motor and said line, a magnet, a plurality of coils, means including said motor for rotating said magnet past said coils for successively inducing voltage pulses in said coils, a plurality of selectively operable contacts for selectively connecting a plurality of said coils to said line during predetermined revolutions of said magnet whereby two pulses separated by time intervals in accordance with the coils selected are transmitted over said line.

20. A settable selector switch comprising a plurality of manually movable dials, finger indentations in each of said dials bearing indicia representing the characters to be selected, holding members engaging said dials for securing each dial in a selected position, a contact individual to each of said dials and individual to each of the positions of each of said dials and a conductor attached to each dial and extendable to any of said contacts in accordance with the selected position of the corresponding dial.

CLARENCE A. LOVELL.
DAVID B. PARKINSON.

REFERENCES CITED

The following references are of record in the file of this patent:

UNITED STATES PATENTS

| Number | Name | Date |
|---|---|---|
| 548,406 | Thomson | Oct. 22, 1895 |
| 757,030 | Faller | Apr. 12, 1904 |
| 769,228 | Norstrom | Sept. 6, 1904 |
| 799,346 | Lundquist | Sept. 12, 1905 |
| 1,972,289 | Chauveau | Sept. 4, 1934 |
| 2,085,884 | Wilkinson | July 6, 1937 |

FOREIGN PATENTS

| Number | Country | Date |
|---|---|---|
| 210,430 | Great Britain | Nov. 20, 1924 |